M. P. VUCASSOVICH.
RED CAVIAR AND THE METHOD OF MAKING AND PRESERVING THE SAME.
APPLICATION FILED OCT. 8, 1919.
1,388,982. Patented Aug. 30, 1921.
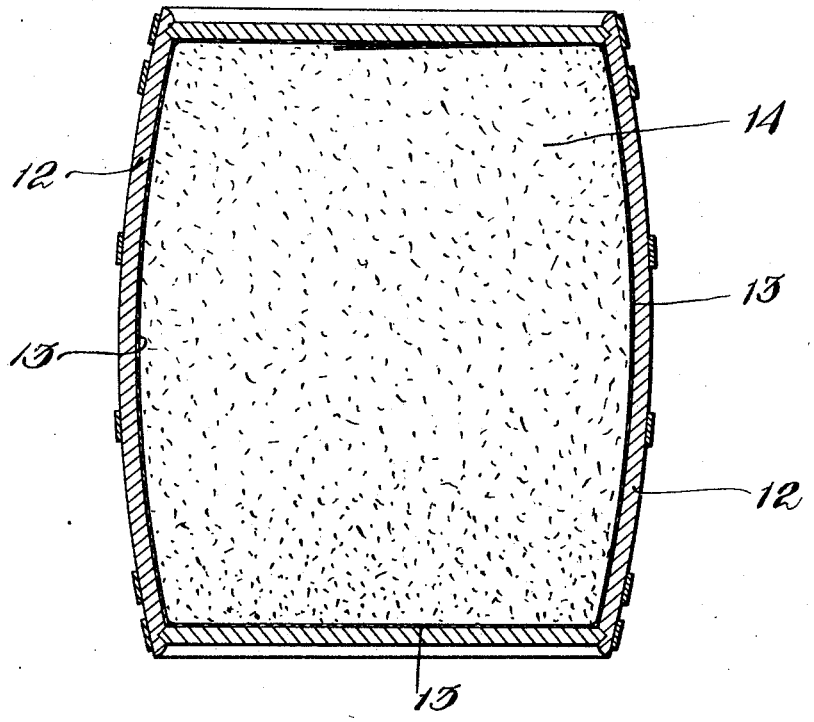

UNITED STATES PATENT OFFICE.

MICHEL P. VUCASSOVICH, OF WELLESLEY, MASSACHUSETTS.

RED CAVIAR AND THE METHOD OF MAKING AND PRESERVING THE SAME.

1,388,982.     Specification of Letters Patent.     Patented Aug. 30, 1921.

Application filed October 8, 1919. Serial No. 329,228.

*To all whom it may concern:*

Be it known that I, MICHEL P. VUCASSOVICH, a citizen of the United States, residing at Wellesley, in the county of Middlesex and State of Massachusetts, have invented new and useful Improvements in Red Caviar and the Method of Making and Preserving the Same, of which the following is a specification.

This invention has for its object to produce a desirable and relatively inexpensive substitute for the food products known as black caviar, made from sturgeon spawn, and Russian tarama, made from the spawn of the taram or pike perch. The spawn of the sturgeon and the pike perch have a natural desirable flavor, color and consistency, the flavor of one, however, differing from the other.

The spawn referred to, however, are either not obtainable in the United States, or are obtainable only at an excessive cost.

I have discovered that by the process hereinafter described various fish spawns which are readily and cheaply obtainable in the United States, and which are normally substantially flavorless, may be converted into a food product having a flavor comparing favorably with either that of black caviar or Russian tarama, and a color and consistency comparing favorably with that of the Russian tarama, which is of a red or reddish color. I have referred to this new product as "Red caviar" or "American tarama".

In carrying out my invention I use any suitable fish spawn, obtainable at a reasonably cost and adapted to be converted into a food product comparing favorably with either black caviar or Russian tarama in flavor, and of a color and consistency resembling Russian tarama. Spawn from either cod, pollock, haddock, cusk, mackerel, sea herring, river herring, salmon, whitefish, or mullet may be employed. As such spawn is normally substantially flavorless, it is necessary, in carrying out my invention, to prepare and cure it in a special way, as hereinafter described, in order to develop the proper flavor, color and consistency.

According to my invention good healthy spawn is selected, the spawn having bruised sacs and any dirt and other matter, such as parts of intestines, being separated from the healthy spawn. The selected spawn is not washed, and is taken in a practically dry condition, devoid of free liquid, that is to say of any liquid not originally contained in the spawn sacs.

The selected spawn may be first ground until the spawn sacs are broken up, the grinding being preferably accomplished by passing the spawn through a suitable grinder.

The spawn sacs may be removed by hand, or otherwise, from the spawn or eggs contained therein, the sacs being discarded instead of being ground and retained in the mixture, in which case the eggs are not necessarily ground. I prefer, however, to grind the eggs and sacs together to save time, labor and expense, the presence of the ground sacs in the mixture being unobjectionable.

Then place the spawn, or the ground spawn and sacs, in a mixing receptacle with a suitable preservative, such as powdered salt and powdered salt-peter, using preferably from eight (8) to ten (10) pounds, more or less, of fine salt and five (5) ounces, more or less, of salt-peter, to one hundred (100) pounds of spawn, the mixture being suitably agitated until the salt and salt-peter are intimately mixed with and distributed through the spawn.

The mixture is then placed in an open container, such as a tub or half hogshead, and left standing in a mass which is exposed to the atmosphere for a suitable period, about two weeks being sufficient, for the action thereon of the ferments and enzymes produced therein.

The mixture is then placed in a receptacle adapted to permit the drainage of all free liquid therefrom. The receptacle is preferably a barrel lined with a foraminous material, such as cheese cloth, to prevent the mixture from escaping and having the hoops thereof loosened to provide drainage outlets between the staves. The material is left in this manner until it has become properly aged and ripened and the desired flavor has been developed. This will occur in from three to six months.

After the mixture has been suitably drained, aged and ripened to the desired flavor, the drainage outlets are closed practically air tight, this being accomplished when the receptacle is a barrel, as above described, by driving home the hoops to close the crevices between the staves, the barrel being then provided with a substantially air tight head.

The air tight receptacle and the mixture contained therein constitute a food package which is marketed as an article of manufacture or the aged and ripened product may be placed in smaller air tight receptacles for distribution and sale.

The accompanying drawing, forming a part of this specification, is a longitudinal section of a package which includes a barrel 12, a cheese cloth lining 13, and a filling 14, of the described mixture.

The package should be kept in a relatively cool place, at a temperature of about 20 degrees to 45 degrees F.

The spawn from either of the sources above specified, prepared without the operation of aging or ripening, does not have the desirable flavor of either the black caviar or the Russian tarama of commerce, because, as above stated, such spawn is normally substantially flavorless. The aging and ripening operation is, therefore, very important and distinguishes my invention from the prior art, the fact being, so far as I am aware, that caviar produced from cheaply obtained sources and having a flavor comparing favorably with either that of black caviar or of Russian tarama has not been produced heretofore. The supply of sturgeon spawn is so limited that the cost of black caviar is now excessive. I am enabled, by my invention, to produce a caviar which is practicably as desirable as either black caviar or Russian tarama and is much less expensive.

I am enabled, by my invention, to manufacture from relatively inexpensive and easily obtained fish spawn a desirable substitute for black caviar and Russian tarama, and, although more time is required for preparing such substitute for use, the cost of the product is much less than that of the product for which it is a substitute.

It is obvious that any equivalent procedure to that hereinbefore described may be followed without departing from the spirit of the invention which includes freely exposing a mixture of spawn and a suitable preservative to the atmosphere for a limited time, then aging or ripening the product until the desired flavor has been obtained, without considerable exposure to the atmosphere and in such a manner as to permit drainage of free liquid from the entire mass, and finally packing the product in air tight receptacles.

Having thus described the invention what is claimed is:

1. The method of making and preserving caviar from normally substantially flavorless spawn comprising thoroughly incorporating with the fresh spawn powdered salt and salt-peter and aging or ripening the product to the development of the desired flavor.

2. A caviar made from substantially flavorless spawn intimately mixed with powdered salt and powdered salt-peter and aged or ripened to the desired flavor.

In testimony whereof I have affixed my signature.

MICHEL P. VUCASSOVICH.